July 20, 1937.  P. J. ANDERSON  2,087,275
CULTIVATOR
Filed Sept. 24, 1936  3 Sheets-Sheet 3
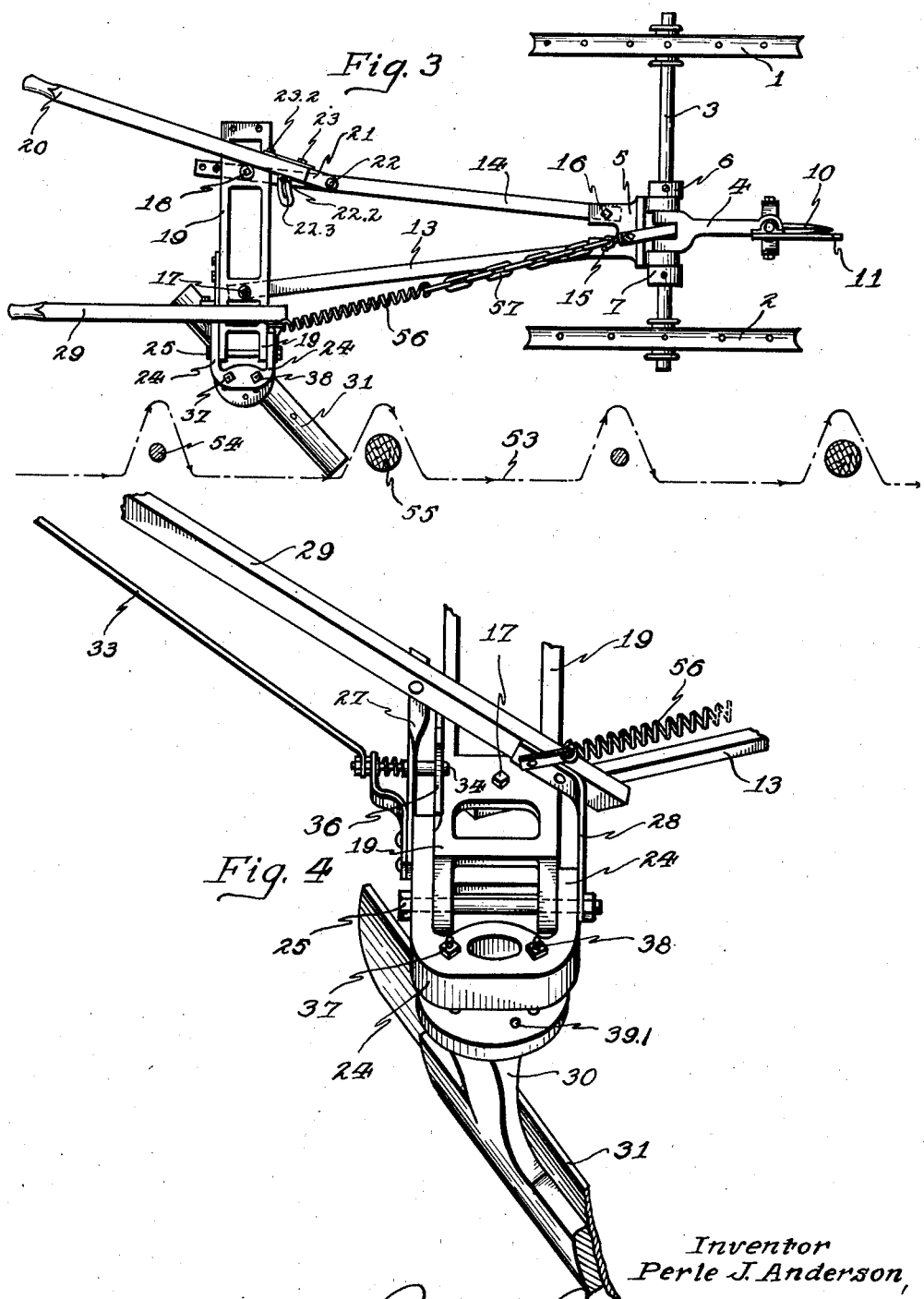
Inventor
Perle J. Anderson,
Attys Patented July 20, 1937

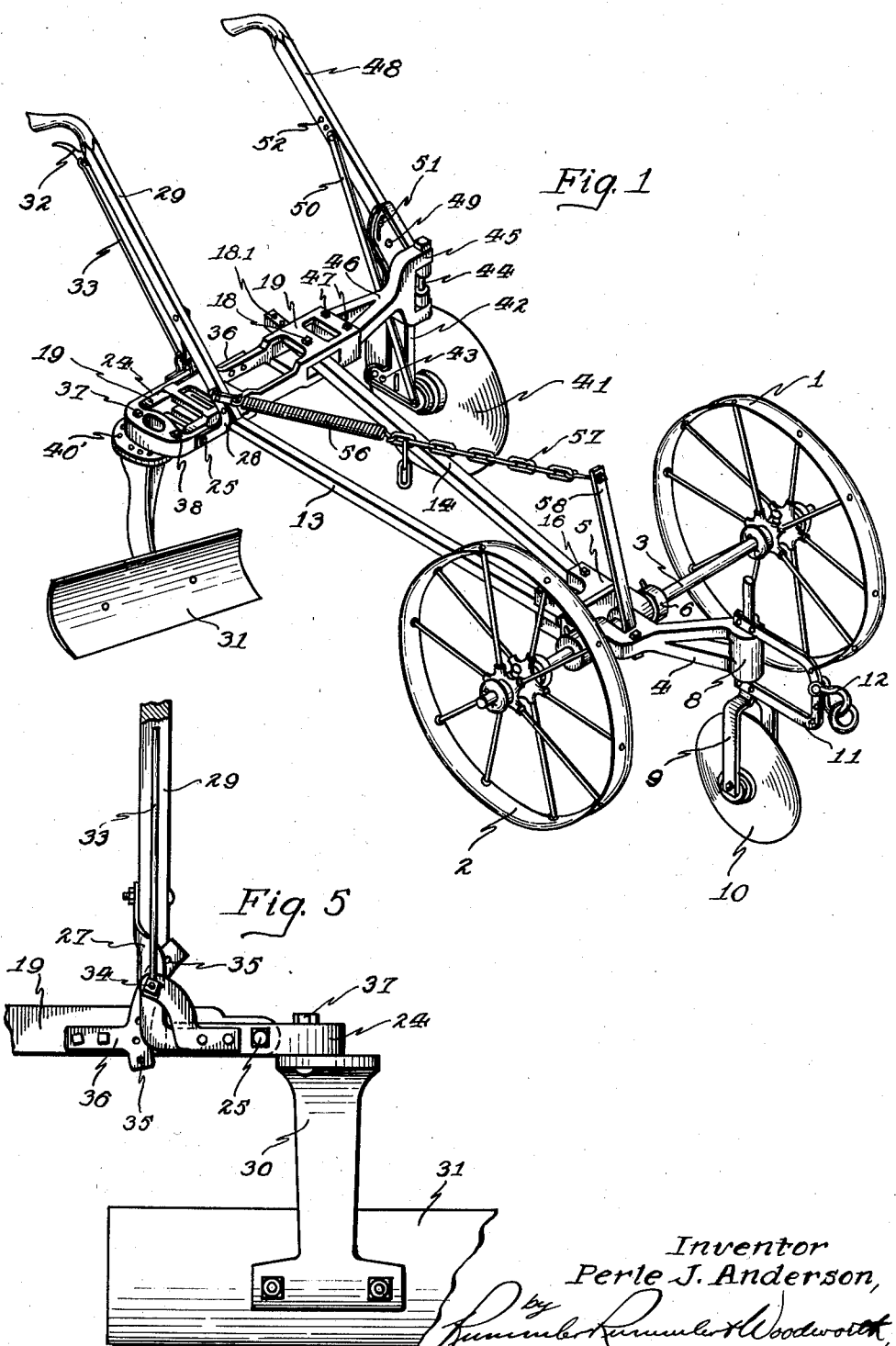

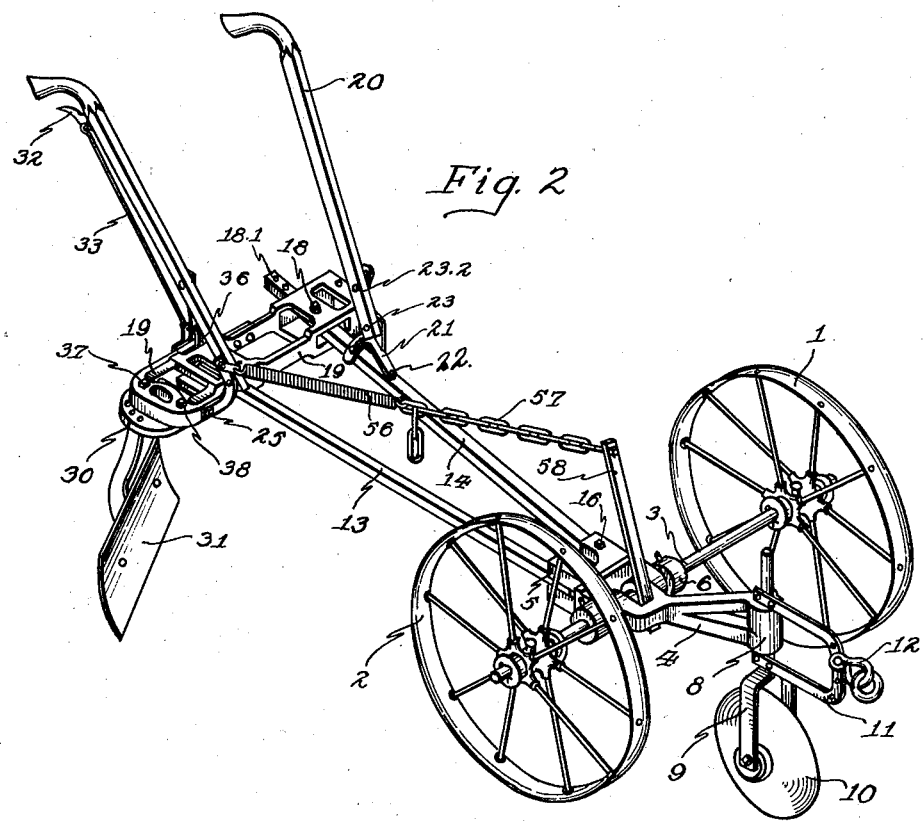

2,087,275

UNITED STATES PATENT OFFICE 2,087,275

CULTIVATOR

Perle J. Anderson, Portland, N. Y.

Application September 24, 1936, Serial No. 102,321

7 Claims. (Cl. 97—135)

This invention relates to cultivators of a type which has proved highly satisfactory for accomplishing rapid and thorough work, particularly in such cases where cross cultivation is not employed. Machines of the class referred to are disclosed in patents to Butt No. 505,506, September 26, 1893, and to Anderson No. 816,418, March 27, 1906.

A main purpose of the invention is to improve this type of cultivator by the addition of a disc guide wheel in the forward end of the structure, which like a colter cuts into the ground and resists side thrust of the forward end of the machine around a rear center formed by the ground working part of the equipment; a further purpose of the invention is to render cultivators of this class more easy to manipulate and to counterbalance the ground-working part of the structure against the draft and permit the tool to ride up over fixed obstructions; a further purpose of the invention is to improve structural details of this type of cultivator.

The purposes of the invention are accomplished by means of a construction as illustrated in the drawings wherein:

Figure 1 is a perspective view of the improved machine.

Fig. 2 is a similar perspective view of the cultivator with part of the equipment removed therefrom to allow the maximum freedom of action thereof when cultivating between plants in a row, whereas the illustration Figure 1 pertains to the machine as equipped for use in hilling.

Fig. 3 is a plan view of the machine as arranged according to the showing in Fig 2.

Fig. 4 is an enlarged perspective view partly in section of the working tool and its mounting, the frame structure and a guide handle being shown partly broken away.

Fig. 5 is a fragmentary detail to illustrate a tool adjusting feature whereby the angular setting of the tool around a horizontal axis is determined.

Fig. 6 is a perspective view of the ground working tool detached from its supporting structure.

Fig. 7 is a perspective view of a bracket for supporting one of the operating handles.

A feature of cultivators of the class to which this invention relates is that of having a frame structure for the soil-working tool pivoted to a wheeled carriage at the front of the machine and on a vertical axis, while the soil-working tool is dragged offset from the line of draft but at an angle thereto which serves by the action of cutting to counteract the tendency for the tool to swing into the line of draft. These opposed forces are balanced by adjusting the machine so as to render the tool easy of manipulation in the process of swinging it laterally to get in between or to clear plants.

The highly efficient and easy operation of the cultivator, however, is dependent on whether or not the forward carriage vibrates or shifts laterally during operation of the machine. One of the improvements applied to the cultivator is that of a disc suitable for cutting into the ground and having connections with the forward carriage and to a draft appliance in such manner as to resist lateral movement of the carriage, while there is an articulated arrangement for movement of various elements of the machine up and down, and a resilient connection to the rear end of the tool frame permitting the frame to be counterbalanced to the desired degree by the pulling force applied through the draft connections.

The machine frame structure is also improved to permit removal of and not be dependent upon the rear steering and thrust resisting disc customary in such cultivators and is arranged to provide for a finer adjustment of the tool around a vertical axis than may be had by the customary arrangement for effecting such adjustment.

The machine as illustrated includes a front carriage formed by the supporting wheels 1 and 2 on an axle 3.

The axle passes through forked bearings 4 and 5 and is prevented from shifting in the direction of its length by the axle collars 6 and 7 pinned thereto. Both bearings 4 and 5 are free to swing on the axle. Bearing 4 at its forward end also forms a bearing 8 for a disc carrying fork 9. The disc 10 journaled at the lower end of the fork serves as a forward guide or steering wheel. The fork which carries the disc is rigid with a U-shaped element 11 serving to keep the disc in line with the direction of pull. The U-member carries clevis 12 to which a draft appliance may be hooked.

Frame bar elements 13 and 14 are pivoted, at their forward ends, on vertical axes provided by the bolts 15 and 16, to the bracket-shaped member 5. Bolts 17 and 18 provide pivotal means for attaching a transverse frame member 19 to the frame bars 13 and 14.

An operating handle 20 (Fig. 3) is rigidly but adjustably secured to the bar 14 by being attached to an angle plate 21 which is pivoted to bar 14 by a bolt 22 in plate aperture 22.1, but held against swinging around this bolt by a bolt 22.2 passing through the curved slot 22.3 in the horizontal leg of plate 21. The handle 20 is pivoted for vertical adjustment on bolt 23 in aperture 23.1 in the vertical leg of plate 21 and fastened by bolt 23.2 in a quadrant slot 23.3 in said vertical leg. The angular setting of operating handle 20 laterally with reference to frame member 14 is determined by the position of the bolt 23 in slot 23.1. The frame member 19 carries at one end a U-shaped casting 24 which pivots on a fore-and-aft axis provided for by a bolt 25 passing through the arms of the U-member and the frame element 19. Attached to and forming extensions of the tool carrying U-shaped casting 24 are bent steel straps 27 and 28 which carry a handle 29 in rigid relation to the casting 24. By swinging the handle around the pivot formed by bolt 25 the tool supporting element 24 and the tool structure carried thereby consisting of the shank casting 30 and blade 31, are adjusted to either level the blade 31 with the ground or cause one or the other of its lower corners to cut a V-shaped furrow.

A grip 32, Figs. 1 and 2, pivoted to the upper end of the handle 29 is connected by a rod 33 with a spring actuated locking bolt 34 whereby the angular setting of the handle 29 and tool unit carried thereby is retained due to the bolt extending through one of the apertures 35 in a quadrant bracket 36 fixed to the frame member 19.

The adjustment of blade 31 and its carrier 30 around a vertical axis is effected by removing one of bolts 37 or 38 and swinging it around the other one until the desired hole of the series 39.1 or 40.1 in the member 30 registers with the hole in casting 24. A still further and finer adjustment of the blade on a vertical axis is obtained by changing the point of attachment of frame member 19 and frame member 14, in which case the bolt 17 provides a pivot around which the frame 19 may be swung. For this purpose the frame 14 has a series of holes 18.1.

The machine as so far described is complete for the purpose of cultivating between plants in a row and throwing the removed material inwardly between the rows.

When the machine is used for hilling from between rows toward the rows of plants, the blade unit is adjusted for that purpose by means of the adjustments above-described, but the balance of forces which serve to retain the blade in offset position from a center line of draft when cultivating between plants is no longer serviceable and the blade tends to swing over into the line of draft. It, therefore, becomes necessary to resist such lateral motion of the blade and this is accomplished by means of disc 41, Fig. 1. Disc 41 is carried by a casting 42 which has a plurality of apertures 43 for attachment of the bearing of the disc so that it may be located in the most effective position according to the angle of the tool. The bearing member 42 is swiveled on a vertical bolt 44 carried by the forked end 45 of a removable extension 46 of frame 19. The extension 46 is rigidly attached to frame 19 by the bolts 47. The steering handle 48 in this arrangement is attached to casting 42 by a bolt 49 and is braced by a bar 50 extending from the lower end of casting 48 to the handle bar. The slot and pin connection 51 and the series of apertures 52 in the handle allow for vertical adjustment of the handle around bolt 49.

The lateral thrust resisting steering disc is an old feature as disclosed in the above-mentioned Anderson patent, but in that organization of the machine it also served as a support for the machine frame. In the present arrangement such support is not necessary and the machine is complete for certain purposes as illustrated by Fig. 2.

The improved frame construction maintains its position above the soil without the support of the disc and lateral shifting of the tool may be freely effected without the aid of a steering disc except for hilling. Proper reactance to lateral thrust of the entire machine around the working tool is provided for by the colter-like disc 10 at the front of the machine.

The dot and dash line 53, Fig. 3, indicates the path of the outer corner of blade 31 when used for cultivating between plants and posts indicated by the circles 54 and 55.

The frame structure of the machine swivels on the axle 3; thus if the blade 31 encounters a fixed obstruction such as a rounded rock, it may ride up over it. Downward motion of the frame round the axle 3 is resisted by spring 56 connecting the rear end of the frame to a chain or other equivalent adjustable attachment to an upwardly and rearwardly extending spring bar 58 secured at its lower end to the draft casting 4. This is a safety feature allowing for a slight swiveling motion of the draft appliance around the axle 3 and against resilient reaction if movement of the machine is checked, due to some obstruction over which the blade 31 cannot ride or clear by lateral motion.

In the operation of the machine, assuming that it is used for hilling up the earth along the rows of plants, the blade 31 is set as indicated in Fig. 1 and the attachment which carries the steering disc 41 is secured to the frame member 19. The blade 31 is held to its desired course by swinging the handle 48 from left to right as required. The lateral thrust on the blade is transmitted to disc 41 through the frame structure but the frame as a whole is further resisted from oscillation either around the blade 31 or the disc 41 by the forward colter disc 10.

When the machine is operated for the normal cultivating operations of throwing the removed material away from the plant rows, the detachable unit carrying disc 41 need not be used. The working tool 31 then naturally follows along a line which is parallel with the line of draft and spaced to one side of the longitudinal center line of the machine. It is urged toward the center line because of the resistance of the work performed at a point offside from the center line, but it is likewise urged by an equivalent force in the opposite direction because of the angular setting of the tool, tending to cause it to move outwardly. Under these conditions the frame and tool may be swung easily from side to side around the forward pivots 15 and 16 which are retained against lateral movement by the disc 10 plus the normal resistance formed by the supporting wheels 1 and 2.

In the arrangement shown in Fig. 2, the operator utilizes both handles 20 and 29 for guiding the cultivator blade and the balance of forces is so well effected by the structure shown that shifting of the blade into and out of the rows, as shown by broken line 53 in Fig. 3, requires but slight sidewise pressure on the handles. In fact, this operation can be performed with such ease that the draft animal or tractor can proceed at uniform and rather rapid speed while the operator swings the blade in and out of the row in a path like line 53 with the ability to approach quite close to an obstruction or plant stem and to clear it with a minimum of effort as compared with that of previous machines of this type.

I ascribe these new results to the guide disc 10 which prevents lateral shifting of the wheeled front end of the carriage and to the improved structural features of the cultivator frame which permit of adjustments for soil conditions so as to cause the shovel to travel parallel to the line of draft and relieve the handles from all strains except that of moving the blade sidewise into and out of the row that is being worked.

Although but one specific embodiment of this invention is herein shown and described, it is to be understood that details as set forth may be altered or omitted without departing from the spirit of the invention as defined by the following claims.

I claim:

1. A cultivator of the class described comprising a frame structure carrying a soil-working tool at the rear end thereof, a supporting wheel carriage for said frame at its forward end, and a draft appliance extending forwardly from said carriage and pivoted thereto on a transverse horizontal axis, said draft appliance being formed at its forward end to provide a vertical bearing, draft means swiveled in said vertical bearing, and a steering and lateral resistance disc carried by and journaled on said means.

2. A cultivator of the class described comprising a frame structure carrying a soil-working tool at the rear end thereof, a supporting wheel carriage for said frame at its forward end and a draft appliance extending forwardly from said carriage and pivoted thereto on a transverse axis, an arm rigid with and extending upwardly from said draft appliance, a resilient connection between said arm and said frame, said draft appliance being formed at its forward end to provide a vertical bearing, draft means swiveled in said vertical bearing, and a steering and lateral resistance disc carried by and journaled on said means.

3. A cultivator of the class described comprising a frame structure setting in a horizontal plane and having vertical pivot joints at its corners, a supporting carriage pivotally connected to the forward corners of said frame, a soil-working tool depending from one of the remaining corners of said frame and having a connection with the frame permitting adjustment of said tool around vertical and horizontal axes, and a steering disc and lateral thrust resisting unit detachably connected with the remaining corner of said frame.

4. A cultivator of the class described comprising a frame structure setting in a horizontal plane and having vertical pivot joints at its corners, a supporting carriage pivotally connected to the forward corners of said frame, a soil-working tool depending from one of the remaining corners of said frame and having a connection with the frame permitting adjustment of said tool around vertical and horizontal axes, a steering disc and lateral thrust resisting unit detachably connected with the remaining corner of said frame, said carriage having supporting wheels, and a soil-cutting disc connected with said carriage and having the function of resisting lateral motion thereof.

5. A cultivator comprising a truck body frame, a cultivator body frame having hinged connection to said truck body frame for relative vertical movement, an upwardly extending arm on said truck body frame, and a spring tension connection between said arm and the rear end of said cultivator body frame.

6. A cultivator comprising a truck axle, a truck body frame, a cultivator body frame having hinged connection to said truck body frame for relative vertical movement about said axle, an upwardly extending arm on said truck body frame, and a spring tension connection between said arm and the rear end of said cultivator body frame.

7. A cultivator body frame comprising a pair of longitudinal bars pivotally mounted at their front ends for horizontal swinging, a cross beam at the rear ends of said bars and having pivotal connection thereto for relative movement only in a horizontal plane, a tool arm hinged to said cross beam on a horizontal axis, transverse to said cross beam, an operating handle fixed to said tool arm, detent means for angular adjustment of said arm by said handle, and a second operating handle fixed to said body frame near the opposite end of said cross beam.

PERLE JAY ANDERSON.